United States Patent
Kirchen et al.

[11] Patent Number: 5,846,039
[45] Date of Patent: Dec. 8, 1998

[54] POSITIVE LOCK RIVET

[75] Inventors: James T. Kirchen, Chippewa Falls, Wis.; Edward P. Massof, Rochester Hills; Robert Nesky, Troy, both of Mich.

[73] Assignee: Illinois Tool Works Inc., Glenview, Ill.

[21] Appl. No.: 874,011

[22] Filed: Jun. 12, 1997

[51] Int. Cl.⁶ .................................................. F16B 13/04
[52] U.S. Cl. .................................. 411/34; 411/48; 411/43
[58] Field of Search ................................ 411/34–38, 41, 411/43, 46, 45, 47, 48

[56] References Cited

U.S. PATENT DOCUMENTS

| | | | |
|---|---|---|---|
| 4,012,984 | 3/1977 | Matuschek | 411/34 |
| 4,222,304 | 9/1980 | Yoshida | 411/34 |
| 4,639,175 | 1/1987 | Wollar | 411/43 |
| 5,540,528 | 7/1996 | Schmidt | 411/48 |
| 5,568,675 | 10/1996 | Asami | 411/48 |

FOREIGN PATENT DOCUMENTS 1241123  8/1960  France ...................... 411/34

*Primary Examiner*—Flemming Saether
*Attorney, Agent, or Firm*—Kane,Dalsimer,Sullivan,Kurucz, Levy, Eisele and Richard, LLP

[57] ABSTRACT

A positive lock rivet for joining a plurality of panels is composed of resilient plastic material and has a pin and a body having an axial bore. The pin has a head and a shank, the pin shank having a locking means, a break joint adjacent to the locking means and a break portion adjacent to the break joint and opposite the head. The body has a head and a shank. The body shank has a proximal end, a distal end, a collapsible portion and a noncollapsible portion. Integral with the proximal end of the body shank is a retention means and integral with the body shank between the collapsible portion and the body head is a flexible annular skirt positionable between the panels to be joined. The body shank is insertable into aligned holes in the panels. The pin is drawn into the body until the pin head engages the distal end of the body shank, causing collapse of the collapsible portion of the body shank and flexure of the annular skirt until the locking means engages the retention means, thereby tightly locking the rivet assembly. The break portion of the pin shank is then broken off at the break joint flush with the body head.

6 Claims, 5 Drawing Sheets

POSITIVE LOCK RIVET

BACKGROUND OF THE INVENTION

1. Field of the Invention

This invention relates to a positive lock rivet for joining a plurality of panels, and, more particularly, to a plastic positive lock rivet comprising a body with an axial bore and a pin. The body is insertable into aligned holes in the panels to be joined. Integral with the body is a flexible annular skirt which is positioned between the panels and provides a means for adjusting for panel thickness. The pin is drawn into the body thereby causing outward radial bending of the walls of the body and flexure of the annular skirt until a locking means on the pin engages a retention means on the body thereby tightly locking the entire assembly. A superfluous portion of the pin is then broken off at a break joint on the pin flush with the body head.

2. Description of the Prior Art

Plastic rivets are typically used to join two or more panels. Plastic rivets generally have a pin which is driven into a body. The body has a head, a shank and an axial bore extending through the head and the shank for receiving the pin. The body is insertable into aligned holes in the panels to be joined by the plastic rivet.

The body shank of a typical plastic rivet is provided with interior annular grooves and a plurality of elongated perforations about its walls. When the pin is driven into the axial bore of the body, the walls of the body shank bend radially outwardly trapping the panels between the body head and the body shank and preventing extraction of the body from the aligned holes of the joined panels. As the walls so bend, the pin translates through the body until a serrated portion of the pin engages the annular grooves of the shank, thereby locking the rivet assembly in a permanent fashion. The superfluous portion of the pin is broken off, either through use of a break-away indentation or a separate cutting tool. Plastic rivets of the aforementioned type are well known and in use. U.S. Pat. Nos. 4,222,304, 4,306,824, 4,355,934, 4,402,638 and 4,556,351 are illustrative.

Many prior art rivets, however, have proven unsatisfactory in that either a separate cutting process is needed to remove the superfluous portion of the pin, or, with rivets employing a break-away indentation, the pin break is not guaranteed to be flush with the body head and may require an additional cutting process to ensure that the pin does not protrude beyond the body head. A second problem with prior art rivets is that they are suitable for use only with panels having a narrow range of combined thickness. The strength and stability with which panels are held together by a rivet depends largely on the length of the body shank portion which protrudes beyond the panels. If the body shank is very short, for example, there will be an insufficient force between the body head and the outwardly bent portion of the body shank to hold the panels together tightly. Thus, prior art plastic rivets are generally rated for specific panel thicknesses, necessitating the manufacture of different sized rivets for applications having different panel thicknesses.

Therefore, in order to alleviate these problems, an objective of the present invention is to provide a plastic rivet in which the pin break is guaranteed to be flush with the body head without the use of a separate cutting tool. A second objective of the present invention is to provide a plastic rivet which provides a means for adjusting for variations in panel thickness, thereby making the rivet suitable for use in a wider range of applications than prior art rivets and ensuring a flush pin break regardless of the thickness of the panels.

SUMMARY OF THE INVENTION

A positive lock rivet in accordance with the present invention achieves the above and other beneficial objects by providing a plastic rivet having a pin and a body having an axial bore extending therethrough. The body has a head and a shank having a proximal end and a distal end. Integrally molded with the proximal end of the body shank is a retention means which is engageable with a locking means on the pin. The body shank has a collapsible portion formed of a plurality of legs which bend radially outwardly when the body is subjected to an axially compressive force. Integrally molded with the body shank and positioned between the body head and the collapsible portion is a flexible annular skirt which slopes towards the distal end of the body shank.

The pin has a head at a distal end engageable with the distal end of the body shank and a shank forming the remainder of the pin. The pin shank has a locking means, a break joint adjacent to the locking means and a break portion adjacent to the break joint and opposite the head which extends beyond the body head when the pin is fully inserted into the body.

In operation the rivet is inserted into aligned holes in the panels to be joined such that the body head bears against the panels and the annular skirt is positioned between the panels. The rivet so positioned, the body head is pressed firmly against the panels and an axial tensile force is applied to the break portion of the pin shank using an appropriate tool thereby inducing an equal and opposite compressive force in the body. This force simultaneously causes the legs of the collapsible portion of the body shank to bend radially outwardly and the pin to translate axially through the body head. As the legs so bend, the annular skirt positioned between the panels flexes towards the body head, thereby bringing the panels closer together and ensuring sufficient bending of the legs for the locking means to engage the retention means. In this way the annular skirt compensates for variations in panel thickness and allows the same rivet to be used for a wider range of applications than prior art rivets.

The pin translates through the body head and the annular skirt flexes until the locking means on the pin shank engages the retention means on the body shank, at which point the panels are firmly and permanently held between the body head and the outwardly bent portion of the body shank. The application of a force to the break portion of the pin after the locking means has engaged the retention means causes the pin shank to break at the break joint flush with the body head.

A positive lock rivet in accordance with the present invention offers two primary advantages over the prior art. First, a pin break flush with the body head is guaranteed, regardless of the thickness of the panels being joined. Second, the use of the annular skirt provides a means for adjusting for variations in panel thickness, thereby making the rivet suitable for use in a wider range applications than prior art rivets. Other advantages will become apparent from the discussion below.

DETAILED DESCRIPTION OF THE PREFERRED EMBODIMENT

The aforementioned Figures illustrate a positive lock rivet 10 in which identical numerals in each Figure represent identical elements.

Figure 1:
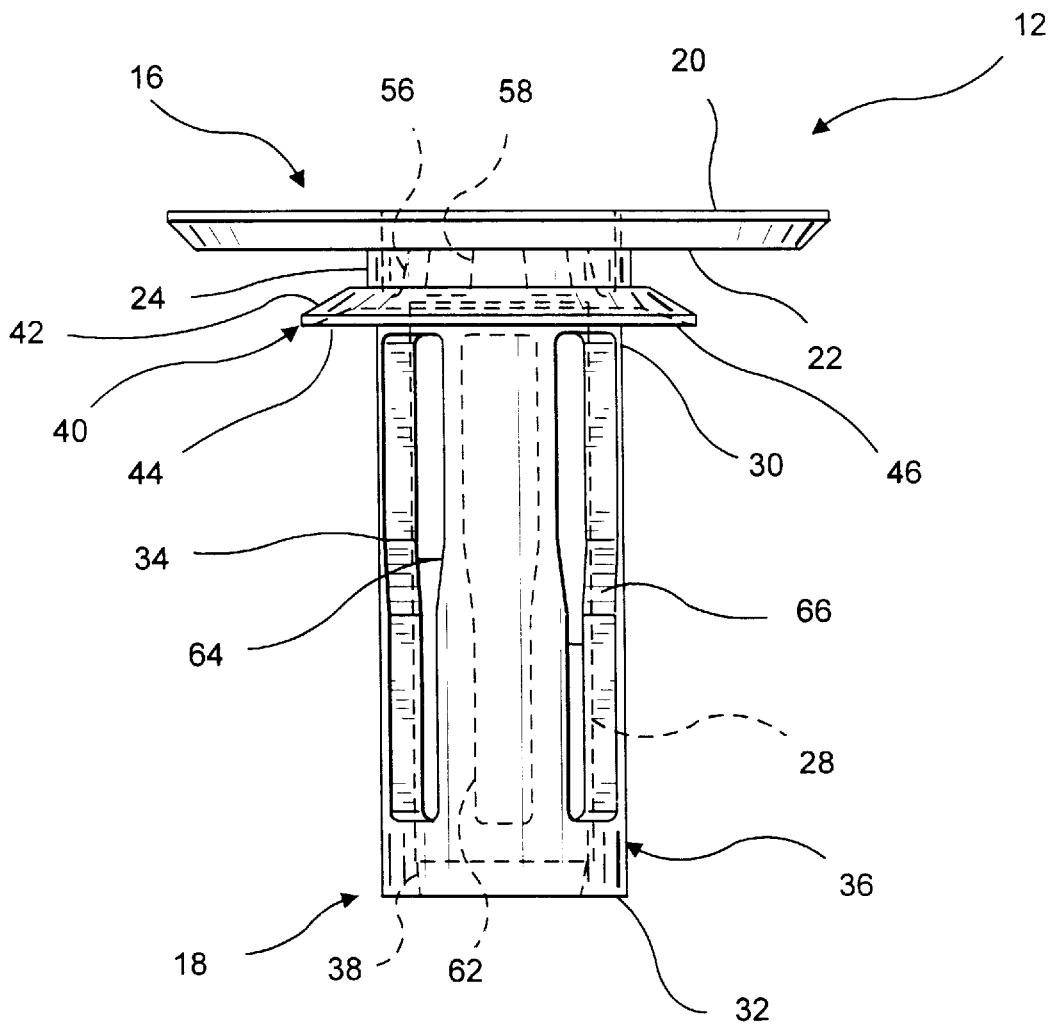
FIG. 1 is a front view of the rivet body according to the present invention.
Figure 2:
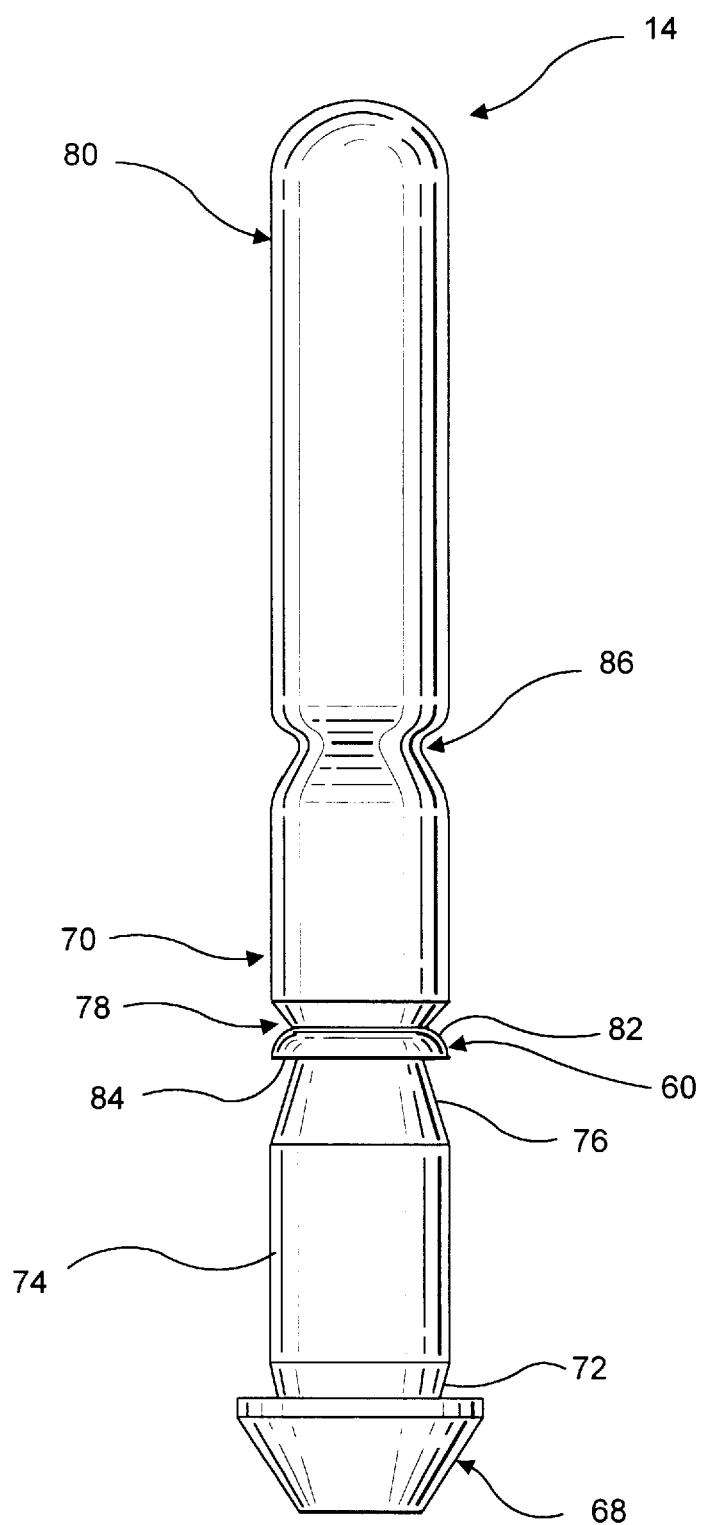
FIG. 2 is a front view of the rivet pin.
Figure 3:
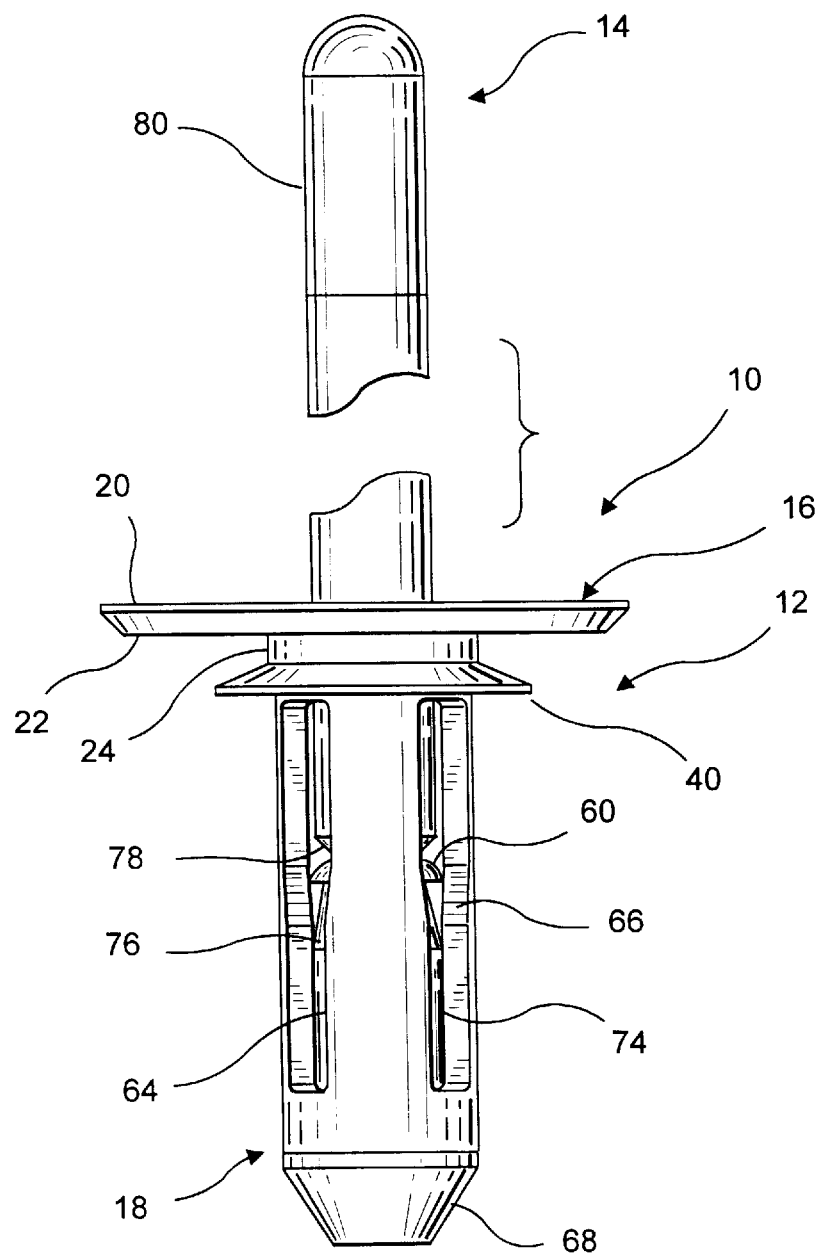
FIG. 3 is a front view of the assembled rivet in an uncompressed state.

With reference to FIG. 3, numeral 10 represents the positive locket rivet in accordance with the preferred embodiment of the invention. As illustrated in FIGS. 1 and 2, positive lock rivet 10 has a separately molded plastic body 12 and pin 14. Body 12 is preferably made of nylon 6/6 and pin 14 is preferably made of acetal. Body 12 has a body head 16 integrally molded to a body shank 18.

Body head 16 has an upper surface 20, a lower surface 22 and a shoulder 24. Upper surface 20 and lower surface 22 have circular cross sections. The area of lower surface 22 is smaller than the area of upper surface 20, the difference in area providing for a larger pressure on panel P1 when the rivet is fully locked, thus ensuring that a moisture tight seal is developed between body head 16 and panel P1, while at the same time providing body head 16 with sufficient strength to withstand the stress developed therein when the rivet is filly compressed and locked.

Body head 16 has a circular bore 26 which is coaxial with a circular bore 28 in body shank 18. Together bores 26 and 28 form a single continuous axial bore which extends through the length of body 12. Body shank 18 is cylindrical in shape and has a proximal end 30, a distal end 32, a collapsible portion 34, and a noncollapsible portion 36 at distal end 32. Bore 28 of body shank 18 has a reduced diameter portion 38 which serves to strengthen distal end 32 when the rivet is fully compressed and locked, as discussed more fully below.

Figure 4:
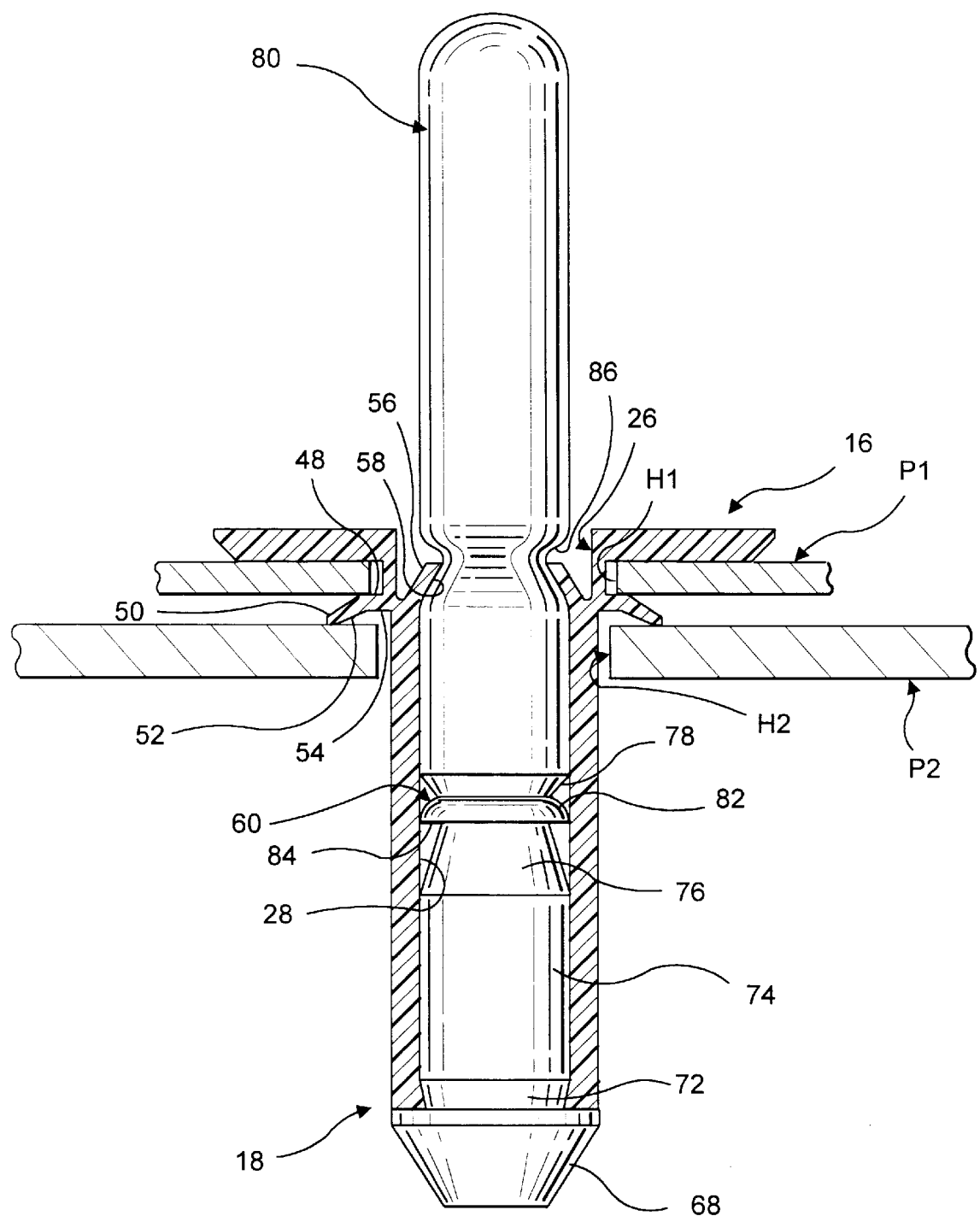
FIG. 4 is a cross-sectional view of the assembled rivet in an uncompressed state.
Figure 5:
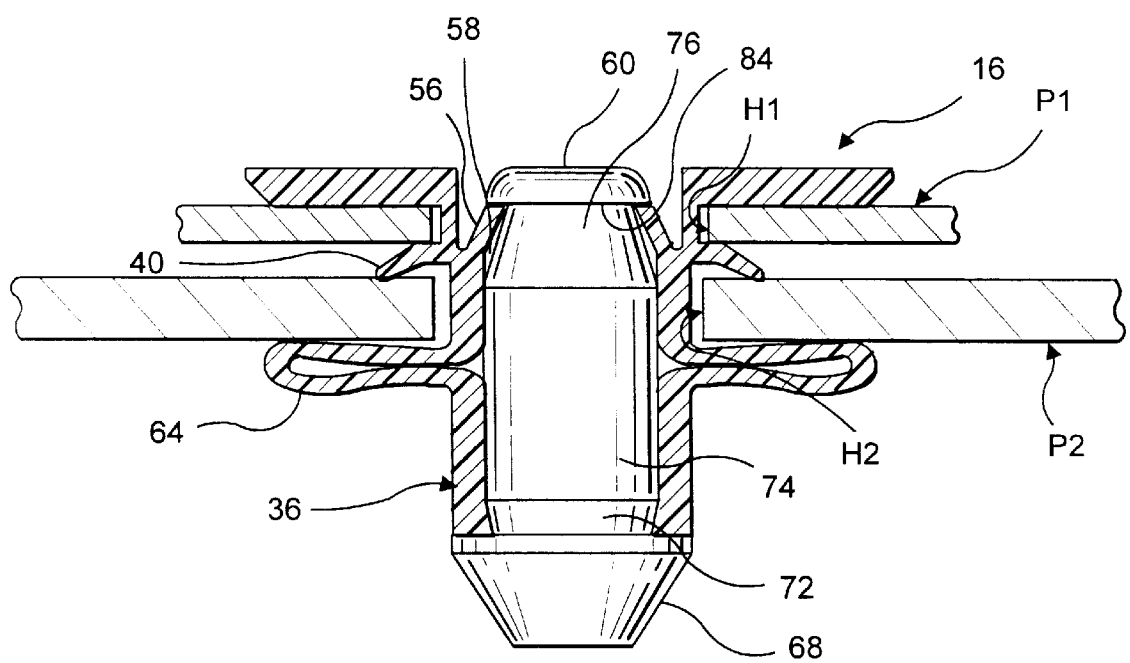
FIG. 5 is a cross-sectional view of the assembled rivet in a compressed and locked state.

Integrally molded with body shank 18 at proximal end 30 between collapsible portion 34 and shoulder 24 is an annular skirt 40 having an upper surface 42, a lower surface 44 and an outer surface 46. With reference to FIG. 4, the upper surface 42 of annular skirt has a flat portion 48 and a sloping portion 50 which slopes towards distal end 32 of body shank 18. Lower surface 44 of annular skirt 40 has a sloping portion 52 and a flat portion 54 as well. However, the slope of sloping portion 52 of lower surface 44 is less severe than the slope of sloping portion 50 of upper surface 42 such that the thickness of annular skirt 40 tapers to outer surface 46, as shown in FIGS. 4 and 5. It is this tapered profile which provides annular skirt 40 with the flexibility required to adjust for panel thickness, as discussed more fully below. Flat portions 48 and 54 serve to strengthen annular skirt 40 during flexure by providing a support where annular skirt 40 meets body shank 18, the area of maximum stress on annular skirt 40. The diameter of annular skirt 40 at outer surface 46 is larger than the diameter of body shank 18 but less than the diameter of body head 16.

Integrally molded with proximal end 30 of body shank 18 and equally spaced thereabout are four flexible fingers 56 which are equally angled towards the longitudinal axes of bores 26 and 28, thereby creating a tapered passage 58 the minimum diameter of which is smaller than the diameter of bore 28, as shown in FIG. 4. The angle and length of fingers 56 are chosen such that when positive lock rivet 10 is in a fully compressed state as shown in FIG. 5, protrusion 60 of pin 14 is flush with upper surface 20 of body head 16, as discussed more fully below.

Collapsible portion 34 has three slots 62 which define three legs 64 which bend radially outwardly upon application of a compressive force to body 12. With reference to FIG. 1, each leg 64 is provided with a center portion 66 along which each leg 64 bends.

Pin 14 has a pin head 68 and a pin shank 70. Pin head 68 is a tapered cylinder having a maximum diameter equal to the diameter of bore 28 of body shank 18. When pin 14 is fully inserted into body 12, pin head 68 abuts distal end 32 of body shank 18 thereby preventing further insertion of pin 14 into body 12. Pin shank 70 consists of six portions, namely, a first indentation 72, an engageable portion 74, a second indentation 76, a protrusion 60, a break joint 78, and a break portion 80.

Engageable portion 74 is cylindrical in shape and has a diameter slightly larger than the diameter of bore 28 such that when pin 14 is fully inserted into body 12 as shown in FIG. 4, a frictional force is developed between the interior walls of body shank 18 and engageable portion 74, thereby holding the assembled rivet in releasable association and allowing for easy insertion of the rivet assembly into the panels to be joined. In practice, body 12 and pin 14 are so associated immediately after manufacture so as to facilitate transfer of the rivet from the manufacturing facility to the end user. First indentation 72 is a tapered cylinder having a shape complementary to reduced diameter portion 38 of bore 28 such that when pin 14 is fully inserted into body 12 first indentation 72 and reduced diameter portion 38 are not frictionally engaged. This serves to reduce the stress at distal end 32 of body shank 18 when the rivet is fully compressed and locked so that noncollapsible portion 36 does not collapse and cause loosening or failure of the rivet over time.

Adjacent to engageable portion 74 is second indentation 76 which is a tapered cylinder complementary in shape to passage 58 formed by fingers 56. Adjacent to second indentation 76 is protrusion 60. With reference to FIG. 2, an upper surface 82 of protrusion 60 slopes towards pin head 68 while a lower surface 84 of protrusion 60 is flat. The diameter of lower surface 84 is larger than the minimum diameter of passage 58, as shown in FIG. 5. This shape permits protrusion 60 to pass through passage 58 by causing outward flexure of fingers 56 while at the same time preventing protrusion 60 from retreating through passage 58 since second indentation 76 relieves the flexure of fingers 56 such that fingers 56 return to an almost unflexed position after protrusion 60 fully clears passage 58, as shown in FIG. 5.

Break joint 78 is a tapered cylinder having its minimum diameter adjacent to protrusion 60. The minimum diameter of break joint 78 is made small enough that pin shank 70 will break at break joint 78 upon application of a force to break portion 80 after the rivet assembly is fully compressed and locked, as shown in FIG. 5. Break portion 80 has a diameter equal to the diameter of engageable portion 74. In order to provide relief to fingers 56 before the rivet is set, break portion 80 is provided with an indentation 86 having a shape complementary to passage 58 which is slightly frictionally engageable with fingers 56. Fingers 56 rest against indentation 86 when pin 14 is fully inserted into body 12, as shown in FIG. 4.

In practice plastic lock rivet 10 is used as follows. Pin 14 and body 12 are initially separated from each other as they are separately molded in the manufacturing process. Prior to insertion of the rivet into the panels to be joined, pin 14 is inserted into body 12. As discussed above, the diameter of engageable portion 74 of pin shank 70 is slightly greater than the diameter of bore 28. Thus, when pin 14 is fully inserted into body 12 a frictional force is developed between pin 14 and body 12, thereby keeping the entire rivet assembly in loose association. The associated rivet assembly is inserted into aligned holes H1 and H2 in panels P1 and P2, respectively. Holes H1 and H2 both have diameters larger than the diameter of body shank 18 and smaller than the diameter of lower surface 22 of body head 16.

For proper performance of positive lock rivet 10, the diameter of hole H1 must be slightly smaller that the diameter of annular skirt 40 at outer surface 46 such that as the rivet assembly is inserted into holes H1 and H2 the force developed due to the engagement of panel P1 and annular skirt 40 causes flexure of annular skirt 40 and thereby allows panel P1 to become positioned between body head 16 and annular skirt 40. By the same token, the diameter of the hole H1 cannot be so small that annular skirt 40 will be prevented from passing through hole H1 regardless of the degree of flexure. Alternatively, if panel P1 is made of a sufficiently flexible and resilient material, panel P1 may be stretched to fit over body head 16 and thereby become positioned between body head 16 and annular skirt 40. Still alternatively, hole H1 may have a "key-hole" shape, that is a cross section which tapers from a maximum diameter substantially equal to the outer diameter of annular skirt 40 to a minimum diameter substantially equal to the diameter of shoulder 24. In this manner body 18 may be inserted into holes H1 and H2 and then moved laterally so as to position panel P1 between head 16 and annular skirt 40 as shown in FIG. 4.

The diameter of hole H2 must be sufficiently small that panel P2 does not become positioned between body head 16 and annular skirt 40 when the rivet is fully compressed and locked. The rivet is properly inserted into holes H1 and H2 when lower surface 22 of body head 16 bears against panel P1, panel P1 is positioned between annular skirt 40 and body head 16, and panel P2 is positioned below annular skirt 40, as shown in FIG. 4.

Using an appropriate tool commonly available in the fastener trade, body head 16 is pressed firmly against panel P1 while an axial tensile force is applied to break portion 80 of pin shank 70. Because pin head 68 is engageable with the distal end of body shank 18, an equal and opposite compressive force is applied to body 12 causing legs 64 to bend radially outwardly about center portion 66. As legs 64 so bend, annular skirt 40 flexes towards body head 16 and pin 14 translates through body head 16. When protrusion 60 reaches passage 58, fingers 56 are flexed outwardly, thereby allowing protrusion 60 to pass through. After lower surface 84 clears passage 58, fingers 56 return to a nearly unflexed position, second indentation 76 comes to rest in passage 58, and lower surface 84 comes to rest on the ends of fingers 56, as shown in FIG. 5.

Positive lock rivet 10 is now locked since protrusion 60 cannot retreat through passage 58. Panels P1 and P2 are firmly and permanently held between legs 64 and body head 16. The force holding the rivet assembly together is of sufficient strength that only destruction of plastic lock rivet 10 will enable separation of panels P1 and P2. The rivet so locked, the continued application of a force to break portion 80 causes the breaking of pin 14 at break joint 78. The length and inclination of fingers 56, the length of shoulder portion 24 of body head 16, and the size of protrusion 60 are chosen such that upper surface 82 of protrusion 60 is flush with upper surface 20 of body head 16 when the rivet is locked.

With respect to annular skirt 40, it is clear that as body 12 is compressed, panels P1 and P2 are pressed together, thereby causing annular skirt 40 to flex towards body head 16 until protrusion 60 engages fingers 58. The benefit of this arrangement is that as annular skirt 40 flexes, the degree of bending of legs 64 and thus the distance traveled by pin 16 increases, thereby ensuring that protrusion 60 will engage fingers 56, regardless of the combined thicknesses of panels P1 and P2. In cases where panels P1 and P2 have a large combined thickness, if annular skirt 40 were not present the collapse of body shank 18 would be insufficient such that protrusion 60 would never engage fingers 56 and the rivet would be unable to lock. Thus, annular skirt 60 provides a means for adjusting the effective length of collapsible portion 34 of body shank 18 such that the same rivet may be used for a wider range of panel thicknesses than prior art rivets.

Thus, the aforementioned objects and advantages are most effectively attained. Although a single preferred embodiment of the invention has been disclosed and described in detail herein, it should be understood that this invention is in no sense limited thereby and its scope is to be determined by that of the appended claims.

We claim:

1. A positive lock rivet for insertion into a plurality of aligned holes in a plurality of at least two panels having a first and second panel, said rivet formed of resilient plastic material and comprising:

a pin, said pin having a head at a distal end and a shank, said shank having a locking means, a break joint adjacent to said locking means and a break portion opposite to said head and adjacent to said break joint;

a body into which said pin is drawn, said body having a head, a shank and an axial bore with a longitudinal axis extending through said head and said shank for receiving said pin, said shank having a collapsible portion formed of a plurality of legs adjacent to said head and a noncollapsible portion at a distal end, said legs being bendable about a center portion of said legs;

a retention means integral with a proximal end of said body shank and engageable with said locking means, said retention means comprises a plurality of flexible fingers, each of said flexible fingers having an end, said flexible fingers being inclined at equal angles towards the longitudinal axis of said bore so as to form a tapered passage having a minimum width at the ends of said fingers smaller than the width of said bore; and said locking means comprises an indentation and a protrusion, said indentation having a shape complementary to said passage formed by said fingers, said protrusion having a flat lower surface and an upper surface sloping away from said lower surface toward said break portion, the width of said flat lower surface being larger than the minimum width of said passage;

a flexible annular skirt integral with said body shank for adjusting for variations in the thickness of said panels, said skirt positioned between said collapsible portion and said body head and adapted to be positioned between said first panel and said second panel;

wherein when said pin is drawn into said body, said pin head engages said distal end of said body shank and causes said legs to bend radially outwardly about said center portion and said annular skirt to flex towards said body head until said locking means engages said retention means wherein said pin breaks at said break joint flush with said body head after said locking means engages said retention means;

and wherein when said pin is drawn into said body, said protrusion passes through said passage causing flexure of said fingers until said flat lower surface passes through said passage and reposes upon the ends of said fingers and said indentation reposes in said passage.

2. The positive lock rivet according to claim 1 wherein said pin shank has an engagement portion adjacent to said pin head frictionally engageable with said body shank.

3. The positive lock rivet according to claim 2 wherein:

said pin shank has a second indentation between said head and said engagement portion;

said bore has a reduced diameter portion for receiving said second indentation;

and wherein said second indentation and said reduced diameter portion are not frictionally engageable.

4. The positive lock rivet according to claim 3 wherein said break portion and said engagement portion are of equal diameter and said break portion has an indentation for receiving said fingers.

5. The positive lock rivet according to claim 1 wherein said body is formed of nylon 6/6.

6. The positive lock rivet according to claim 1 wherein said pin is formed of acetal.

* * * * *